United States Patent Office 3,250,728
Patented May 10, 1966

3,250,728
HYDROCARBON CONVERSION CATALYST AND
METHOD OF PREPARATION THEREOF
Joseph N. Miale, Runnemede, N.J., and Paul B. Weisz, Media, Pa., assignors to Socony Mobil Oil Company, Inc., a corporation of New York
No Drawing. Filed July 16, 1962, Ser. No. 210,212
12 Claims. (Cl. 252—455)

This invention relates to a process for catalytically converting hydrocarbons in the presence of a unique catalyst, the activity of which is unexpectedly enhanced or promoted as a result of treatment with ammonium sulfide. More particularly, the present invention is concerned with a method wherein an organic charge undergoes catalytic transformation in the presence of a crystalline aluminosilicate catalyst resulting from treatment of a crystalline metal aluminosilicate salt with a solution containing ammonium sulfide to replace the metal cations of said crystalline aluminosilicate with ammonium ions and subsequent heating of the ammonium aluminosilicate so formed to an elevated temperature sufficient to release ammonia and to yield a resulting hydrogen aluminosilicate.

It has heretofore been reported that various chemical reactions may be advantageously carried out by contact catalysis using as catalyst crystalline metal aluminosilicate zeolites having rigid three-dimensional networks made up of unit cells characterized by the substantial absence of change in unit cell dimensions upon dehydration and rehydration and a homogeneous highly uniform pore structure. The above requirements are fulfilled by certain crystalline zeolites known as molecular sieves. The reactions effectively catalyzed by such materials include by way of example, hydrocarbon cracking, alkylation, dealkylation, disproportionation, isomerization and polymerization.

The ability of the above catalysts to influence and direct the course of chemical conversions entails an unusual degree of catalytic selectivity. Briefly, two types of selectivity are involved; first, geometrical selectivity which depends on the relationship between the diameter of the pores in the crystal structure of the aluminosilicate zeolite and the diameter of the reactant and product molecules and second, intrinsic catalytic selectivity which depends on the choice of cations present on the internal surfaces of the crystalline aluminosilicate.

It has also heretofore been known to prepare acid or hydrogen crystalline aluminosilicates by treatment of initially formed metal aluminosilicates, generally the alkali metal aluminosilicates, with ammonium salts such as ammonium chloride and ammonium acetate as well as ammonium hydroxide to replace the metal cations of the aluminosilicate with ammonium ions, after which the ammonium aluminosilicate is thermally decomposed driving off ammonia and yielding a resulting hydrogen aluminosilicate. It has also been reported that hydrogen or acid aluminosilicates may be prepared by treating acid-stable crystalline aluminosilicates, such as mordenite, with a solution of a mineral acid to afford direct exchange between the original metal cations of the aluminosilicate and hydrogen ions of the acid solution.

In accordance with the present invention, it has now been discovered that an unusually effective cracking catalyst may be prepared by treating a crystalline metal aluminosilicate characterized by a uniform pore structure made up of pores of between about 3 and about 15 Angstrom units in diameter with a solution containing ammonium sulfide to replace cations of said aluminosilicate with ammonium ions and subsequently thermally decomposing the resulting ammonium aluminosilicate to yield a hydrogen aluminosilicate and ammonia. It has been found, in accordance with the instant invention, that treatment of a crystalline metal aluminosilicate of the type specified with ammonium sulfide solution affords a resulting composition having an unexpectedly higher cracking activity than when the metal aluminosilicate is treated with ammonium salt solutions of the type previously employed such as, for example, ammonium chloride or ammonium acetate.

In one embodiment, the present invention provides a method for preparing a catalytic composition by treating a crystalline metal aluminosilicate characterized by a uniform pore structure made up of pores of between about 3 and about 15 Angstrom units in diameter with a solution of ammonium sulfide to effect replacement of at least about 75 and preferably at least about 90 percent of the metal cations of the aluminosilicate with ammonium ions and subjecting the resulting product to an elevated temperature, generally in excess of about 800° F. to release ammonia therefrom.

In another embodiment, the invention affords a catalytic composition prepared by the aforementioned method.

In a further embodiment, the invention resides in a method for converting an organic charge in the presence of a catalytic composition prepared by the aforementioned method.

The metal aluminosilicates initially employed in preparing the present catalyst are essentially dehydrated forms of crystalline siliceous zeolites, containing varying quantities of alkali metal, alkaline earth metal and aluminum with or without other metals. All or a portion of the alkali metal and alkaline earth metal ions normally contained in the zeolitic structure may be replaced with a number of other ions. The atoms of alkali metal, alkaline earth metal or metals in replacement thereof, silicon, aluminum and oxygen are arranged in a definite and consistent crystalline pattern. Such structure contains a large number of small cavities, interconnected by a number of still smaller channels. These cavities and channels are precisely uniform in size. The interstitial dimensions of openings in the crystal lattice limit the size and shape of the molecules that can enter the interior of the aluminosilicate and it is such characteristic of many crystalline zeolites that has led to their designation as "molecular sieves."

Zeolites having the above characteristics include both natural and synthetic materials, for example, chabazite, gmelinite, mesolite, ptiliolite, mordenite, natrolite, nepheline, sodalite, scapolite, lazurite, leucrite and cancrinite. Synthetic zeolites may be of the A type, X type, Y type, T type or any other well known form of molecular sieve, including ZK zeolites such as those described in copending application Serial No. 134,841 filed August 30, 1961. Preparation of the above type zeolites is well known, having been described in the literature, for example, A type zeolite in U.S. 2,882,243; X type zeolite in U.S. 2,882,-244; Y type zeolite in Belgium Patent No. 577,642 and T type zeolite in U.S. 2,950,952. As initially prepared, the metal of the aluminosilicate is an alkali metal and usually sodium. Such alkali metal is subject to base exchange with a wide variety of other metal ions. The molecular sieve materials so obtained are unusually porous, the pores having highly uniform molecular dimensions, generally between about 3 and about 15 Angstrom units in diameter. Each crystal of molecular sieve material contains literally billions of tiny cavities or cages interconnected by channels of unvarying diameter. The size, valence and portion of the metal ions in the crystal control the effective diameter of the interconnecting channels.

At the present time, there are commercially available molecular sieves of the "A" series and of the "X" series. A synthetic zeolite known as "Molecular Sieve 4A" is a crystalline sodium aluminosilicate having channels of about 4 Angstroms in diameter. In the hydrated form, this material is chemically characterized by the formula: $Na_{12}(AlO_2)_{12}(SiO_2)_{12} \cdot 27H_2O$. The synthetic zeolite known as "Molecular Sieve 5A" is a crystalline aluminosilicate salt having channels about 5 Angstroms in diameter and in which substantially all of the 12 ions of sodium in the immediately above formula are replaced by calcium, it being understood that calcium replaces sodium in the ratio of one calcium for two sodium ions. A crystalline sodium aluminosilicate having pores approximately 10 Angstroms in diameter is also available commercially under the name of "Molecular Sieve 13X." The letter "X" is used to distinguish the interatomic structure of this zeolite from that of the "A" crystals mentioned above. As prepared, the 13X material contains water and has the unit cell formula:

$$Na_{86}[(AlO_2)_{86}(SiO_2)_{106}] \cdot 267H_2O$$

The 13X crystal is structurally identical with faujasite, a naturally occurring zeolite. Faujasite, however, is not identical in composition with the 13X zeolite. The synthetic zeolite known as "Molecular Sieve 10X" is a crystalline aluminosilicate salt having channels about 10 Angstroms in diameter and in which a substantial proportion of the sodium ions of the 13X material have been replaced by calcium.

Molecular sieves of the "X" series are characterized by the formula:

$$M_{86}[(AlO_2)_{86}(SiO_2)_{106}] \cdot 267H_2O$$

where M is $Na^+$, $Ca^{++}$ or other metal ions introduced by replacement thereof and $n$ is the valence of the cation M. The structure consists of a complex assembly of 192 tetrahedra in a large cubic unit cell 24.95 A. on an edge. Both X and Y type crystalline aluminosilicates have essentially identical crystal structures. They differ from each other in chemical composition with type Y aluminosilicate having a higher $SiO_2/Al_2O_3$ ratio than the X type aluminosilicate.

The alkali metal generally contained in the naturally occurring or synthetically prepared zeolites described above may be replaced partially or completely by other metal ions. Suitable replacing ions include other alkali metals, for example sodium may be replaced with lithium or potassium; alkaline earth metals such as calcium, strontium and magnesium, as well as various other ions such as those of cobalt, zinc, silver, nickel, copper, chromium, iron, zirconium, thorium, beryllium, manganese, palladium, tin, rhenium, aluminum, gold, platinum, cadmium, mercury, lanthanum, cerium and other rare earth metals. Replacement is suitably accomplished by contacting the initially formed crystalline aluminosilicate with a solution of an ionizable compound of the metal ion which is to be zeolitically introduced into the molecular sieve structure for a sufficient time to bring about the extent of desired introduction of such ion. After such treatment, the ion exchanged product is water washed, dried and calcined.

The metal aluminosilicate may be treated directly with ammonium sulfide solution or it may be initially combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasily be used in combination with the crystalline metal aluminosilicate. Such materials may be catalytically inert or may possess an intrinsic catalytic activity or an activity attributable to close association or reaction with the crystalline aluminosilicate. Such materials include by way of example, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline aluminosilicates may feasibly be prepared as described in copending application of Albert B. Schwartz, Serial No. 147,722 filed October 26, 1961, by growing crystals of the aluminosilicate in the pores of the support. Also, the aluminosilicate may be intimately composited with a suitable binder, such as inorganic oxide hydrogel or clay, for example by ball milling the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be base-exchanged to introduce selected metal ions into the aluminosilicate and then dried and calcined.

The inorganic oxide gel employed, as described above as a matrix for the metal aluminosilicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups IIA, IIIB, and IVA of the Periodic Table. Such components include for example, silica-alumina, silica-magnesia, silica-zirconia, silica-thoria, silica-beryllia, silica-titania as well as ternary combinations such as silica-alumina-thoria, silica-alumina zirconia, silica-alumina-magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well known in the art, such as for example, hydrolysis of ethyl ortho silicate, acidification of an alkali metal silicate and a salt of a metal, the oxide of which it is desired to cogel with silica, etc. The relative proportions of finely divided crystalline aluminosilicate and inorganic oxide gel matrix may vary widely with the crystalline aluminosilicate content ranging from about 1 to about 90 percent by weight and more usually, particularly where the composite is prepared in the form of beads, in the range of about 2 to about 50 percent by weight of the composite.

The aluminosilicate catalyst employed in the present process is preferably used in the form of small fragments of a size best suited for operation under the specific conditions existing. Thus, the catalyst may be in the form of a finely divided powder or may be in the form of pellets of 1/16" or 1/8" size, for example, obtained upon pelleting the crystalline aluminosilicate with a suitable binder such as clay, colloidal, graphite, etc. Likewise, the metal aluminosilicate dispersed in a gel matrix or supported on a suitable porous support of the type descrbed above may be utilized in any desired physical form. For example, hydrogel containing added crystalline metal aluminosilicate powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the aluminosilicate-containing hydrogel. Also, the hydrosol may be introduced into the perforations of a perforated plate and retained therein until the sol has set to a hydrogel, after which the formed hydrogel pieces are removed from the plate. A particularly feasible method is to prepare the catalyst in the form of spheroidal particles by dispersing the powdered metal aluminosilicate in a hydrosol and introducing globules of the resulting hydrosol into a body of water-immiscible liquid, for example an oil medium, wherein the globules of hydrosol set to a hydrogel and subsequently pass into an underlying layer of water from which they are sluiced to further processing operations such as base-exchange, water-washing, drying and calcining. Larger size spheres are ordinarily within the range of from about 1/64 to about 1/4 inch in diameter, whereas smaller size spheres, which are generally referred to as microspheres, are within the range of from about 10 to about 100 microns in diameter. The use of the spheroidally shaped particles is of particular advantage in hydrocarbon conversion processes in which the catalyst is subjected to continuous movement, such as the compact moving bed process, the fluidized process, etc. As applied to the stationary bed, spheroidal catalyst particles provide effective contact between the reactants and the catalyst by avoiding channeling.

While, for the production of spheroidal catalyst particles by the aforementioned technique, initial formation of a hydrosol which sets upon lapse of a short interval of time to an all-embracing bead-form hydrogel is essential, it is also feasible to employ, particularly where the catalyst is prepared in a form other than the spheroidal shape, a matrix comprising a gelatinous hydrous oxide precipitate with varying degrees of hydration or a mixture of a hydrogel and such gelatinous precipitate. The term gel, as utilized herein, is intended to include hydrogel, gelatinous precipitates and mixtures of the two. Also, the matrix may consist of or contain, as a component thereof, a clay and particularly a clay of the montmorillonite or kaolinite families, either raw or acid treated. Other suitable materials for use as the matrix of the present catalyst composition include charcoal, graphite, bauxite and other binders compatible with the crystalline metal aluminosilicate and thermally stable under the temperature conditions at which the catalyst is used.

The solution utilized in the present process for activating the above described metal aluminosilicates essentially contains ammonium sulfide. Such solution may be prepared by dissolving ammonium sulfide crystals in a polar solvent therefor in which ionization of the ammonium sulfide takes place. Suitable solvents for such purpose include water, alcohols and glycols. Of this group, preference is accorded water. The ammonium sulfide may also be formed in situ in solution by introduction of ammonia and hydrogen sulfide into the solvent. The concentration of ammonium sulfide in the treating solution is generally between about 5 and about 30 weight percent and preferably between about 22 and about 26 weight percent.

Contact between the above described metal aluminosilicate and ammonium sulfide solution is carried out utilizing an excess of solution generally between about 2 and about 20 volumes of solution per volume of aluminosilicate. Contact is maintained for a sufficient time to effect replacement of at least about 75 and preferably at least about 90 percent of the metal cations of the aluminosilicate with ammonium ions. When the crystalline metal aluminosilicate undergoing treatment is an alkali metal aluminosilicate, the alkali metal content of the treated product is generally less than 4 and preferably less than 2 weight percent. The time of treatment is dependent on the particular metal aluminosilicate employed as well as on the concentration of the treating solution. Such time is, however, usually within the approximate range of 12 to 48 hours. The temperature at which treatment with the ammonium sulfide solution is carried out is below the boiling point thereof and generally between about 50 and about 180° F.

Treatment of the metal aluminosilicate with the ammonium sulfide solution may be accomplished on a batch basis or in a continuous manner by flowing a stream of such solution over the aluminosilicate maintained in finely divided or particle form. Alternatively, particles of the metal aluminosilicate may be passed through a bath of the ammonium sulfide treating solution. Replacement of the metal ions of the aluminosilicate with ammonium ions may be facilitated or enhanced by agitating, shaking or rolling the metal aluminosilicate being treated and/or the ammonium sulfide treating solution.

After replacement of metal ions of the metal aluminosilicate with ammonium ions, as indicated above, the treated aluminosilicate is removed from contact with the ammonium sulfide solution and subjected to an elevated temperature to release ammonia therefrom. Such temperature is generally in excess of 800° F. and usually within the approximate range of 900 to 1050° F. The time of exposure of the treated aluminosilicate to such elevated temperature is sufficient to remove ammonia therefrom and to yield an acid or hydrogen form of the crystalline aluminosilicate. The atmosphere present during heating of the treated aluminosilicate is one which does not adversely affect the catalytic properties of the product so obtained. Thus, heating may take place in air, helium, nitrogen, argon or other inert gases.

The resulting activated aluminosilicate may, if desired, be combined in finely divided form with a binder or dispersed in a matrix, such as an inorganic oxide gel, described above in connection with the initially employed metal aluminosilicate. It is also feasible to introduce the treated ammonium aluminosilicate into a reaction zone wherein ammonia is a desired reactant or promoter and to effect release of ammonia from the aluminosilicate directly into the reaction zone by raising the temperature of the latter.

The activated aluminosilicate catalysts, prepared as described above, have been found to possess an unusually high activity for the cracking of hydrocarbons. Such activity, hereinafter designated as $\alpha$, is determined by cracking of n-hexane. In accordance with such procedure, a stream of helium was bubbled through liquid n-hexane to vaporize the charge, giving a vapor pressure of 153 mm. of n-hexane in the charge stream. Contact of the catalyst and charge was carried out at atmospheric pressure, utilizing a residence time of 18 seconds in a small heated reactor zone containing 3 cc. of catalyst at 850–1000° F. As is well known in the art, the conversion scale approximates a scale of per-unit-catalyst activity scale only at low conversion, since conversion approaches a constant of 100 percent for arbitrarily large per-unit-catalyst activities. The relationship between fractional conversion C and catalytic activity, i.e. the catalytic activity rate constant per unit quantity of catalyst $k$ is usually and conveniently based on a first order rate law and may be expressed as follows: $C=1-e^{-k\tau}$ where $\tau$ is the residence time. When catalytic activity is prepared at a given residence time in the case of two comparative tests, this relationship results in the following relationship between the activity ratio and the observed fractional conversions in the two cases $C_1$ and $C_2$:

$$\alpha = \frac{K_2}{K_1} = \log\frac{1}{1-C_2} \bigg/ \log\frac{1}{1-C_1}$$

In this manner, the increase of activity between the ammonium sulfide activated catalyst and that carried out utilizing a standard cogelled silica-alumina composite containing approximately 10 weight percent alumina and 90 weight percent silica can be conveniently noted regardless of the conversion level.

The reactions promoted by the activated crystalline aluminosilicate catalysts described herein involve conversion of certain classes of organic compounds, including cracking of paraffinic, olefinic, aromatic and naphthenic hydrocarbons as well as mixtures thereof, for example petroleum fractions, such as those boiling in the gas oil range; disproportionation of aromatics; dehydration of alcohols to olefins and ethers; hydration of olefins to alcohols; isomerization and polymerization of olefins; isomerization of terpenes; alkylation and dealkylation of aromatic hydrocarbons.

The cracking of hydrocarbons, and particularly normal hydrocarbons having a carbon chain of from 5 to 30 carbon atoms, represents an especially advantageous use of the ammonium sulfide treated crystalline aluminosilicate catalysts since the nature of the products may be well controlled. The catalyst in such process may be used as pellets in a fixed bed operation or they may be used in a compact moving bed operation or in a fluidized operation. The general operating conditions cover a wide range because of the wide utility of the catalysts. In cracking paraffins for the production of olefins, it is generally desirable to carry out such process at atmospheric pressure, employing a temperature in the approximate range of 700 to 1200° F. and preferably 800 to 1000° F. The liquid hourly space velocity of the charge may range from 0.2 to 40, preferably from 0.5 to 20. The normal paraffins that may be charged range from $C_5$ to $C_{30}$ paraffins and mixtures thereof. Generally, the conversion of charge improves with increasing molecular weight, so that for hexane cracking, for example, the low ranges of space velocity and higher temperatures are desirable for satisfactory conversion. The cracking of other crackable hydrocarbons including aromatics containing alkyl chains, naphthenes and olefins is likewise advantageously carried out with the hereinabove described catalysts which have undergone treatment with ammonium sulfide.

Catalytic cracking with the activated crystalline aluminosilicate catalysts described herein may be carried out by contacting a crackable hydrocarbon charge at catalytic cracking conditions employing a temperature within the approximate range of 550 to 1100° F. and under a pressure ranging from subatmospheric pressure up to several hundred atmospheres. The contact time of the hydrocarbon charge with the catalyst is adjusted in any case according to the conditions, the particular charge stock and the particular results desired to give a substantial amount of cracking to lower boiling products.

Thus, as illustrative of the usefulness of this invention, it has been established that paraffinic hydrocarbons may be cracked over the described activated crystalline aluminosilicate catalysts to afford a high yield of olefins. The latter are particularly desirable products since they are susceptible to a wide variety of useful applications. They may be employed, for example, in the formation of high octane alkylate; they also may be used for alkylation of benzene to form cumene and other alkyl benzenes; or they may be polymerized to liquid fuels or to form plastics such as polyethylene and polypropylene. In many instances, these desirable olefin products may be formed in high yields by cracking low-valued petroleum charge stocks, such as paraffinic materials in the $C_6-C_{10}$ range.

Disproportionation of aromatic hydrocarbons utilizing the ammonium sulfide activated crystalline aluminosilicate catalysts described herein is carried out by contacting a charge of an alkyl aromatic at a temperature of between about 600 and about 1100° F. Under such conditions, for example, toluene is effectively converted into benzene and xylenes.

Dehydration of alcohols utilizing the ammonium sulfide activated crystalline aluminosilicate catalysts described herein is carried out by contacting a charge of either normal or isoalcohols at a temperature of between about 200° F. and about 650° F. Normal alcohols can, under such conditions, be effectively dehydrated to ethers, while isoalcohols are ordinarily dehydrated to olefins.

In addition to cracking, disproportionation and dehydration, it is contemplated that the ammonium sulfide activated crystalline aluminosilicate catalyst described herein may be effectively employed in various other reactions in which organic compounds undergo chemical conversion or transformation into useful products in the presence of acidic catalyst sites. Thus, the isomerization of olefins and cycloolefins such as terpenes and alkylcyclopentanes; the dehydration of alcohols to ethers and olefins; the disproportionation of aromatic compounds; the polymerization of olefins and vinyl aromatic compounds and the alkylation and dealkylation of aromatics are all reactions which normally are catalyzed by acidic catalyst. The promotion of such reactions over the crystalline aluminosilicate catalysts referred to herein are thus logically to be included within the scope of the present invention.

The following examples will serve to illustrate the method of the invention without limiting the same:

EXAMPLE 1

A 5 ml. portion of natural chabazite having a particle size of 100–200 mesh was contacted with 15 ml. of a 23 weight percent aqueous solution of ammonium sulfide. The mixture was agitated and then allowed to settle for four hours. The supernatant liquid was poured off. The above procedure was repeated three times over a 48 hour period, two of the treats settling overnight. The resulting product was dried in air at ambient temperature and then for 15 minutes at 1000° F. with helium flow immediately prior to use. The material so obtained was employed as a catalyst in the cracking of n-hexane. A stream of helium was bubbled through liquid n-hexane to vaporize the charge giving a vapor pressure of 153 mm. of n-hexane in the charge stream. Contact of the catalyst and charge was carried out at atmospheric pressure, utilizing a residence time of 18 seconds in a heated reactor containing 3 cc. of the catalyst maintained at 1000° F. Samples of the gaseous products were analyzed by gas chromatography at specified intervals. The results are hereinafter set forth in Table I.

EXAMPLE 2

The procedure of Example 1 was repeated using in place of ammonium sulfide, an aqueous solution of 25 weight percent ammonium chloride. Treatment was carried out at 180° F. The treated material was employed as a catalyst in the cracking of n-hexane and 2-methyl pentane. The results are shown below in Table I:

Table I
EXAMPLE 1

| Part Size | °F. | Time on Stream | Percent Cracked | α |
|---|---|---|---|---|
| 100–200 mesh | 1,000 | 5 | 55.8 | 5.7 |
|  |  | 28 | 47.5 | 4.5 |
| Regen. 15 min | 900 | 5 | 44.7 | 16 |
|  |  | 28 | 39.5 | 13 |
|  | 800 | 5 | 27.1 | 15 |
|  | 700 | 5 | (13.7) | Ads. |
|  |  | 26 | 21.5 | 150 |
| Do | 600 | 5 | (Ads.) |  |
|  |  | 27 | 7.9 | (Ads.) |
|  |  | 50 | 10.5 | 850 |
| Do | 1,000 | 5 | 57.3 | 6 |
|  |  | 27 | 42.8 | 3.9 |
| MeC₅ | 1,000 | 6 | 1.3 | -------- |
|  |  | 25 | 1.1 | -------- |

EXAMPLE 2

| Part Size | °F. | Time on Stream | Percent Cracked | α |
|---|---|---|---|---|
| 100–200 mesh | 1,000 | ¹10 | 20.0 | 1.6 |
|  |  | 40 | 23.2 | 1.8 |
|  |  | 70 | 20.7 | 1.6 |
|  |  | 100 | 5.6 | 0.4 |
|  | 900 | 10 | 13.3 | 1.0 |
|  |  | 40–100 | 6.4 | 2.4 |
| 2MeC₅ | 1,000 | 10, 35, 60, 90 | 0.7 | .02 |
| 15 min. air | 1,000 | 10 | ~1 | <.05 |
|  |  | 54 | 0.3 | .01 |
| nC₆ 10 min. air | 700 | 10–70 | 0.4 | 5 |
|  | 1,000 | 100 | 4.2 | 0.3 |

¹ Minutes.

EXAMPLE 3

A 5 ml. portion of natural chabazite was milled to a particle size of less than 5 microns and treated with a 23 weight percent aqueous solution of ammonium sulfide as in Example 1. The material so obtained was tested for n-hexane cracking. The results are hereinafter set forth in Table II.

Table II
EXAMPLE 3

| Part Size | °F. | Time on Stream | Percent Cracked | α |
|---|---|---|---|---|
| 5μ | 1,000 | 5 | 79.7 | 11.1 |
|  |  | 27 | 68.7 | 8.2 |
| Regen. 15 min | 1,000 | 5 | 87.8 | 14.7 |
|  |  | 27 | 74.8 | 9.7 |
|  | 700 | 5 | 37.6 | 450 |
|  |  | 26 | 37.4 | 450 |
|  | 600 | 26 | 25.1 | 2,500 |
|  | 500 | 30 | 10.0 | 12,000 |
|  |  | 52 | 8.2 | 10,000 |
|  | 450 | 71 | 3.4 | 17,000 |
|  | 1,000 | 5 | 80.6 | 11.5 |
|  |  | 25 | 68.8 | 8.2 |

EXAMPLE 4

| Part Size | °F. | Time on Stream | Percent Cracked | α |
|---|---|---|---|---|
| 5μ | 1,000 | 10 | 61.2 | 7.6 |
|  |  | 40 | 68.4 | 8.1 |
|  |  | 70 | 46.2 | 4.8 |
|  |  | 100 | 20.9 | 1.6 |
| MeC₅ | 1,000 | 10, 40, 70 | 1.5–1.6 | .05 |
| nC₆ | 1,000 | 10 | 73.2 | 9.2 |
|  |  | 40 | 42.3 | 3.8 |

It will be seen from the above results that cracking activity at 1000° F. was very much lower for the ammonium chloride exchanged material than for the ammonium sulfide exchanged catalyst.

EXAMPLE 5

A 5 ml. sample of natural mordenite having a particle size of 5 microns was treated with a 23 weight percent aqueous solution of ammonium sulfide for 48 hours as described in Example 1. The resulting product was dried in air at ambient temperature and tested for n-hexane cracking. The results are shown below:

Table III

|  | Preparation | Vol. Cat. Chge. | °F. | Time on Stream, Min. | Percent Cracking | α 1,000° F. |
|---|---|---|---|---|---|---|
|  | Agitation only on change of solution, uncalcined. | 1.5 | 1,000 | 5 | 74.5 | 9.5 |
|  |  |  |  | 26 | 59.8 | 6.4 |
| A | Regenerated |  |  | 5 | 66.7 | 7.7 |
|  |  |  |  | 26 | 12.8 | 1 |
| B | ----do---- |  | 900 | 5 | 41.8 | 13.3 |
|  |  |  |  | 25 | 18.5 | 10 |
| C | ----do---- |  | 800 | 5 | 34.3 | 55 |
|  |  |  |  | 26 | 13.8 | 17 |
| D | ----do---- |  | 700 | 5 | 50 | 700 |
|  |  |  |  | 25 | 10.2 | 100 |
| E | ----do---- |  | 700 | 5 | 79.2 | 1,600 |
|  |  |  |  | 27 | 19.0 | 200 |
| F | ----do---- |  | 600 | 5 | 59.9 | 7,700 |
|  |  |  |  | 27 | 21.2 | 2,000 |
| G | ----do---- |  | 500 | 5 | 42.0 | 62,000 |
| H | ----do---- |  | 400 | 5 | 10.4 | 160,000 |
|  |  |  |  | 25 | 2.2 | 37,000 |
| I | ----do---- |  | 300 | 10 | 0.35 | 100,000 |

EXAMPLE 4

A 5 ml. portion of natural chabazite was milled to a particle size of less than 5 microns and treated with a 25 weight percent aqueous solution of ammonium chloride as in Example 2. The resulting product was tested for n-hexane cracking. The results are shown below in Table II:

As will be noted from the above data, the ammonium sulfide treated catalyst had an exceptionally high activity for hexane cracking, with α measured at 400° F. being approximately 160,000.

EXAMPLES 6 AND 7

A 200 ml. batch of natural mordenite ground to a 5 micron particle size was treated by adding about 300 ml.

of a 23 weight percent aqueous solution of ammonium sulfide, shaking and placing on a roller at room temperature. Treatment was carried out as in Example 1 except that the sample was rolled for 3 hours after changing solutions and allowed to settle for periods of 1 hour and overnight to facilitate changing solutions. The total contact time was 52 hours. The resulting product was dried in air at ambient temperature.

A 50 ml. sample of the catalyst so obtained was calcined for 2 hours in air at 1000° F. prior to testing for n-hexane cracking activity (Example 6). The results of cracking are shown in Table IV.

A 1.5 ml. sample of the uncalcined catalyst (Example 7) was also tested for cracking activity. The results obtained are shown below in Table IV:

*Table IV*

CATALYST OF EXAMPLE 6

|   | Preparation | Vol. Cat. Chge. | ° F. | Time on Stream, Min. | Percent Cracking | α 1,000° F. |
|---|---|---|---|---|---|---|
|   | Rolled and calcined 2 hrs. in air at 1,000° F. | 1.5 | 1,000 | 5 | 96.9 | 2.4 |
|   |   |   |   | 26 | 14.0 | 1.1 |
| A | Regenerated | | 800 | 5 | 11.5 | 18 |
|   |   |   |   | 26 | 6.3 | 8 |
| B | ____do____ | | 700 | 5 | 20.7 | 215 |
|   |   |   |   | 26 | 6.7 | 58 |
| C | ____do____ | | 600 | 5 | 30.0 | 3,100 |
|   |   |   |   | 27 | 10.0 | 950 |
|   | ____do____ | | 500 | 5 | 20.2 | 26,000 |
|   |   |   |   | 27 | 6.9 | 10,000 |

CATALYST OF EXAMPLE 7

|   | Preparation | Vol. Cat. Chge. | ° F. | Time on Stream, Min. | Percent Cracking | α 1,000° F. |
|---|---|---|---|---|---|---|
|   | Rolled, uncalcined | 1.5 | 1,000 | 5 | 77.8 | 10.5 |
|   |   |   |   | 26 | 39.0 | 3.9 |
| A | Regenerated | | 1,000 | 5 | 85.6 | 13.5 |
|   |   |   |   | 27 | 15.7 | 1.2 |
| B | ____do____ | | 700 | 5 | 80.1 | 1,300 |
|   |   |   |   | 28 | 17.0 | 160 |
|   | ____do____ | | 600 | 5 | 83.6 | 14,300 |

EXAMPLE 8

A 5 ml. sample of natural mordenite was treated as in Example 5 except that in place of ammonium sulfide, an aqueous solution of 25 weight percent ammonium acetate was employed. The mixture was rolled as in Example 6 to improve contact and thereafter dried in air at ambient temperature and tested for n-hexane cracking. The results obtained are hereinafter set forth in Table V. It will be seen from such data that the activity of the resulting catalyst was only a fraction of that realized with the $(NH_4)_2S$ treated catalysts.

EXAMPLE 9

A 5 ml. sample of natural mordenite was treated as in Example 5 except that in place of ammonium sulfide, an aqueous solution of 25 weight percent of ammonium sulfite was employed. The catalyst was treated and tested for cracking as in the previous example. The results obtained are hereinafter shown in Table V. It will again be evident that the activity of the resulting catalyst was only a fraction of that achieved with the $(NH_4)_2S$ treated catalyst.

EXAMPLE 10

A 5 ml. sample of natural mordenite was treated as in Example 5 except that in place of ammonium sulfide, an aqueous solution of 25 weight percent of ammonium chloride was employed. The catalyst was treated and tested as described above in Example 8. The results obtained are shown below in Table V. It will be seen that while the hexane cracking activity of this catalyst was high, it was markedly less than that realized with the $(NH_4)_2S$ treated catalyst.

*Table V*

| Catalyst | Exchange | | | Cat. Vol., cc. | ° F. | Time on Stream | Percent Cracking | α |
|---|---|---|---|---|---|---|---|---|
|   | NH₄+Salt, percent | Time of contact, days | Air |   |   |   |   |   |
| Example 8: | Acetate | 2 | No | 1.5 | 1,000 | 5 | 82.3 | 12.1 |
|   |   |   |   |   |   | 25 | 38.2 | 3.3 |
| A |   |   | Regenerated |   | 1,000 | 5 | 52.9 | 5.3 |
|   |   |   |   |   |   | 25 | 13.2 | 1.0 |
| B |   |   | ____do____ |   | 700 | 5 | 10.5 | 105 |
|   |   |   |   |   |   | 25 | 2.5 | 24 |
| Example 9: | Sulfite 25 | 2 | No | 1.5 | 1,000 | 5 | 67.2 | 7.9 |
|   |   |   |   |   |   | 27 | 17.5 | 1.4 |
| A |   |   | Regenerated |   | 1,000 | 5 | 35.1 | 3 |
|   |   |   |   |   |   | 26 | 9.7 | 0.7 |
| B |   |   |   |   | 700 | 5 | 12.3 | 120 |
|   |   |   |   |   |   | 26 | 5.2 | 47 |
| Example 10: | Chloride 25 | 2 | Regenerated | 1.5 | 1,000 | 6 | 95.2 | 22 |
|   |   |   |   |   |   | 27 | 13.9 | 1.1 |
| A |   |   |   |   | 700 | 5 | 94.9 | 2,800 |
|   |   |   |   |   |   | 26 | 18.2 | 160 |

EXAMPLE 11

A 3 ml. sample of natural mordenite treated with ammonium sulfide as in Example 7 was contacted with helium at 1000° F. for 30 minutes and cooled to 700° F. A stream of helium was bubbled through toluene and over the catalyst at 60 ml./minute. Aliquots of the effluent vapor were directed through a chromatographic system for analysis. The catalyst was then regenerated in air at 1000 F. Toluene conversion was checked at 800 to 1000° F. The results are shown below in Table VI:

Table VI

| Catalyst | °F. | Time, Minutes | Conversion, Wt. Percent | Cracked Products | Benzene | Xylenes |
|---|---|---|---|---|---|---|
| Example 11: | | | | | | |
| (Regenerated) | 800 | 5 | 2.7 | 0 | 1.4 | 1.3 |
|  |  | 26 | 0.8 | 0.2 | 0.6 | Trace |
| Do | 900 | 5 | 6.6 | 0.2 | 5.1 | 1.3 |
|  |  | 26 | 6.8 | 0.1 | 4.1 | 2.6 |
| (Not Regen.) | 1,000 | 42 | 24.1 | 0.3 | 7.2 | 16.6 |

It will be seen from the foregoing data that the ammonium sulfide activated crystalline aluminosilicate catalyst was effective for disproportionation of toluene to benzene and xylenes.

It is to be understood that the above description is merely illustrative of preferred embodiments of the invention of which many variations may be made by those skilled in the art without departing from the spirit thereof.

We claim:

1. A method for preparing a catalytic composition which consists essentially of base-exchanging a crystalline alkali metal aluminosilicate characterized by a uniform pore structure made up of pores of between about 3 and about 15 Angstrom units in diameter with a solution of ammonium sulfide, said base exchange being characterized in that it is conducted exclusively with ammonium sulfide to effect replacement of at least about 75 percent of the alkali metal cations of said aluminosilicate with ammonium ions and subjecting the resulting product to an elevated temperature to release ammonia and to yield a resulting hydrogen aluminosilicate.

2. A method for preparing a catalytic composition which consists essentially of base-exchanging a crystalline alkali metal aluminosilicate characterized by a uniform pore structure made up of pores of between about 3 and about 15 Angstrom units in diameter with a solution of ammonium sulfide, said base exchange being characterized in that it is conducted exclusively with ammonium sulfide, to effect replacement of at least about 90 percent of the alkali metal cations of such aluminosilicate with ammonium ions and subjecting the resulting product to a temperature in excess of 800° F. for a sufficient period of time to remove ammonia and to yield a resulting hydrogen aluminosilicate.

3. The method of claim 1 wherein the crystalline alkali metal aluminosilicate is a natural zeolite.

4. The method of claim 1 wherein the crystalline alkali metal aluminosilicate is chabazite.

5. The method of claim 1 wherein the crystalline alkali metal aluminosilicate is mordenite.

6. A catalytic composition prepared by the method of claim 1.

7. A catalytic composition prepared by the method of claim 4.

8. A catalytic composition prepared by the method of claim 5.

9. A method for preparing a catalytic composition which consists essentially of admixing a crystalline alkali metal aluminosilicate in finely divided form characterized by a uniform pore structure made up of pores of between about 3 and about 15 Angstrom units in diameter with a binder therefor, base exchanging the resulting composite with a solution of ammonium sulfide, said base exchange being characterized in that it is conducted exclusively with ammonium sulfide, to effect replacment of at least about 75 percent of the alkali metal cations of said aluminosilicate with ammonium ions and subjecting the resulting product to an elevated temperature to release ammonia and to yield a resulting hydrogen aluminosilicate.

10. The method of claim 9 wherein said binder is an inorganic oxide gel.

11. A catalytic composition prepared by the method of claim 9.

12. A catalytic composition prepared by the method of claim 10.

References Cited by the Examiner

UNITED STATES PATENTS

| | | | |
|---|---|---|---|
| 2,739,991 | 3/1956 | Hervert | 260—672 |
| 2,858,349 | 10/1958 | Linn | 260—672 |
| 2,865,867 | 12/1958 | Van Dyke et al. | 252—455 |
| 2,916,437 | 12/1959 | Gilbert | 208—120 |
| 2,962,435 | 11/1960 | Fleck et al. | 208—119 |
| 2,967,159 | 1/1961 | Gladrow et al. | 252—455 |
| 2,971,904 | 2/1961 | Gladrow et al. | 252—455 X |
| 3,006,153 | 10/1961 | Cook. | |
| 3,130,006 | 4/1964 | Rabo et al. | 252—455 X |
| 3,140,249 | 7/1964 | Plank et al. | 252—455 X |
| 3,140,251 | 7/1964 | Plank et al. | 252—455 X |
| 3,140,252 | 7/1964 | Frilette et al. | 252—455 X |

OSCAR R. VERTIZ, Primary Examiner.

MAURICE A. BRINDISI, Examiner.

E. J. MEROS, Assistant Examiner.